US010274302B2

(12) United States Patent
McGuire et al.

(10) Patent No.: US 10,274,302 B2
(45) Date of Patent: Apr. 30, 2019

(54) INTERNAL DIMENSION DETECTION USING CONTACT DIRECTION SENSITIVE PROBE

(71) Applicant: Amazon Technologies, Inc., Seattle, WA (US)

(72) Inventors: Jonathan G. McGuire, Seattle, WA (US); Ashok Dave, Seattle, WA (US); Thomas Lund Dideriksen, Seattle, WA (US); Brent George, Puyallup, WA (US); Steven Charles Glenner, Bellevue, WA (US); Jake Schintgen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 215 days.

(21) Appl. No.: 15/365,861

(22) Filed: Nov. 30, 2016

(65) Prior Publication Data
US 2018/0149460 A1    May 31, 2018

(51) Int. Cl.
*G01B 3/00* (2006.01)
*G01B 5/02* (2006.01)
(Continued)

(52) U.S. Cl.
CPC ............ *G01B 5/20* (2013.01); *A43D 1/06* (2013.01); *G01B 3/008* (2013.01); *G01B 5/008* (2013.01);
(Continued)

(58) Field of Classification Search
CPC ........ G01B 11/24; G01B 3/008; G01B 5/008; G01B 5/012; G01B 5/016; G01B 5/02; G01B 5/20
(Continued)

(56) References Cited

U.S. PATENT DOCUMENTS

| 6,192,593 B1* | 2/2001 | Borchers | A43D 1/02 |
| | | | 324/716 |
| 7,343,691 B2* | 3/2008 | Long | A43D 1/06 |
| | | | 33/3 R |

(Continued)

FOREIGN PATENT DOCUMENTS

| DE | 4107269 | 9/1992 |
| DE | 102015121582 | 6/2016 |
| WO | WO07097 | 6/1990 |

OTHER PUBLICATIONS

The PCT Search Report and Written Opinion dated Feb. 22, 2018 for PCT application No. PCT/US2017/063766, 13 pages.

*Primary Examiner* — Yaritza Guadalupe
(74) *Attorney, Agent, or Firm* — Lee & Hayes, P.C.

(57) ABSTRACT

A robotic coordinate measurement machine (CMM) having a contact direction sensitive (CDS) probe is usable to detect internal dimensions for an object of interest. A robot arm may contact a surface with the CDS probe which may then detect a magnitude and direction of the resulting reaction force. The robotic CMM may monitor the magnitude and/or direction of the reaction force while the CDS probe is being slide across a surface to determine dimensions for the surface. Changes in the reaction force sensed by the CDS probe may be used to identify contact with other surfaces of contours in the surface the CDS probe is being slid across. A path of the CDS probe may be altered based on the contact with other surfaces or the contours.

20 Claims, 7 Drawing Sheets

(51) Int. Cl.
    *G01B 5/20*    (2006.01)
    *G01B 5/012*   (2006.01)
    *A43D 1/06*    (2006.01)
    *G01B 5/008*   (2006.01)
    *G01B 5/016*   (2006.01)

(52) U.S. Cl.
    CPC ............ *G01B 5/012* (2013.01); *G01B 5/016* (2013.01); *G01B 5/02* (2013.01); *A43D 2200/10* (2013.01)

(58) Field of Classification Search
    USPC .......................................................... 33/3 A
    See application file for complete search history.

(56) References Cited

U.S. PATENT DOCUMENTS

| | | | | |
|---|---|---|---|---|
| 9,752,874 | B1* | 9/2017 | Wilkinson | A41H 1/00 |
| 2008/0235969 | A1 | 10/2008 | Jordil et al. | |
| 2010/0293076 | A1* | 11/2010 | End | G06Q 30/06 |
| | | | | 705/26.7 |
| 2011/0277250 | A1* | 11/2011 | Langvin | A43B 3/0084 |
| | | | | 12/133 R |
| 2012/0316827 | A1* | 12/2012 | Wilkinson | A41H 1/00 |
| | | | | 702/150 |
| 2018/0149460 | A1* | 5/2018 | McGuire | G01B 5/012 |

* cited by examiner

INTERNAL DIMENSION DETECTION USING CONTACT DIRECTION SENSITIVE PROBE

BACKGROUND

Obtaining dimension data for objects is often desirable for a variety of reasons such as, for example, reverse engineering the object or creating a scaled version of the object. Depending on the geometry of an object a variety of dimensioning techniques may be deployed. For example, for an object with relatively few surfaces—all of which are easily accessible—human operation of a conventional coordinate measurement machine (CMM) may suffice. Alternatively, for an object with numerous and complex visible outer surfaces contactless CMM techniques such as laser measurements may be required.

Conventional CMM techniques are ill-suited, however, for obtaining accurate measurements for objects having surfaces which do not lend themselves to conventional line-of-sight or human operation based CMM techniques. For example, neither of the foregoing techniques are optimally suited for obtaining internal dimension data associated with the internal cavity profile of an article of footwear.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 4A-4B depict the CDS probe in different positions within the shoe with reference to a timeline in which time passes from the left to right and from FIG. 4A to 4B.

DETAILED DESCRIPTION

Figure 1:
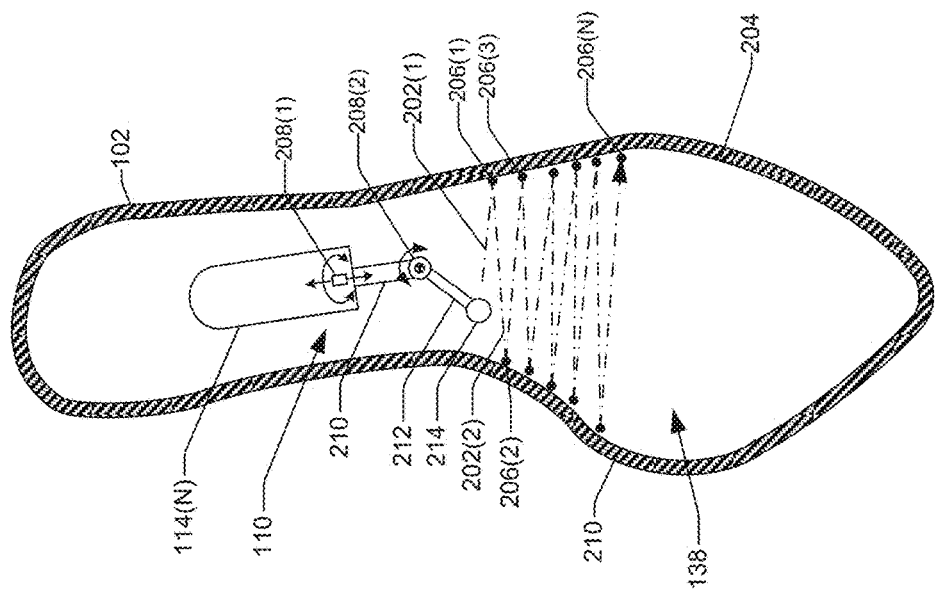
FIG. 1 illustrates a side cross-section view of a shoe with a portion of a robotic coordinate measurement machine (CMM) extending into an inner region of the shoe.

This disclosure is directed to determining dimensions of an object of interest using a robotic coordinate measurement machine (CMM) to move a contact direction sensitive (CDS) probe along the surfaces of the object. The systems, devices, and methods of the present disclosure may be particularly advantageous over conventional CMMs for detecting dimensions for interior surfaces of objects such as, for example, shoes or other wearable articles. However, exterior surfaces may also be determined using technologies of the present disclosure. In some embodiments, the CDS probe may be configured to sense points of contact between an outer surface of the CDS probe and the surfaces of the object of interest. In some embodiments, the points of contact may be determined based on reaction forces exerted by surfaces of the object against the CDS probe, e.g. a reaction force may results from the robotic CMM moving the CDS probe into contact with a surface. The CDS probe may be attached to a distal end of a robot arm that moves the CDS probe into contact with a first object surface to generate such a reaction force against the CDS probe. The CDS probe may then be moved along the first surface to determine dimensions for the first surface based on points of contact between the CDS probe and the first surface. For example, the CDS probe may include a rounded probe tip associated with a datum point that is static with respect to the CDS probe, e.g. a centroid of the rounded probe tip. Thus, dimensions of the object of interest such as points located on the object surfaces may be determined based on an orientation of the CDS probe, the point of contact with the object as experienced by the CDS probe, and an ability to determine the precise location in space of the probe's datum point. In some embodiments, the reaction force may be monitored to dynamically control a position of the CDS probe with respect to the first surface. For example, in response to the reaction force decreasing or ceasing altogether, the robot arm may move the CDS probe toward the first surface to maintain contact between the first surface and the CDS probe. Stated alternatively, the reaction force may be monitored to assist in tracking the first surface.

A change to the direction of the reaction force that occurs as the CDS probe is moved across the first surface may indicate that the CDS probe has contacted a second surface or that the CDS probe is moving across a non-linear portion of the first surface. For example, if the CDS probe is sliding across a first internal surface of a shoe, e.g. an insole surface, and then comes into contact with a second internal surface, e.g. a side portion of the shoe upper, the reaction force may change directions since the CDS probe now has a point of contact with the second internal surface in addition to the first internal surface. In some implementations, the robot arm may change a path of the CDS probe in response to contacting the second internal surface. For example, upon contact with the second internal surface the robot may begin to move the CDS probe along the first internal surface away from the second internal surface or along the second internal surface away from the first internal surface. In various implementations, upon detecting contact with the second internal surface, the CDS probe may be moved along the first internal surface to a third internal surface to continue collecting dimension data corresponding to the first internal surface. Stated alternatively, as described in more detail below with respect to FIG. 2, internal dimensions for the first surface may be collected by moving (e.g., sliding, rolling, etc.) the CDS probe along the first surface back and forth between two or more other surfaces until a sufficient amount of dimension data points have been collected for the first internal surface.

In some embodiments, the CDS probe may be coupled to a distal end of a robot arm (e.g. of a CMM) having a mechanical linkage that conforms to a shape of an internal region of the object to collect dimension data without contacting the internal surfaces with anything other than the CDS probe, e.g. without the mechanical linkage contacting the internal surfaces. For example, the CDS probe may be used to collect internal dimensions for a first portion of an object and these internal dimensions may be used to determine a clearance zone in which mechanical linkage may operate without contacting the object of interest. In particular, the clearance zone may correspond to an internal cavity profile that is bounded by the internal surfaces. In some implementations, the clearance zone may be defined by the internal surface profiles and/or contours such that the clearance zone matches the internal cavity profile of an object of interest. In some embodiments, the clearance zone may be based on but need not match the internal cavity profile. Thus, in some implementations, the CDS probe may be inserted into the object of interest and traversed along hard to reach internal surfaces without inadvertent contact between the robot arm and the object of interest.

The techniques and systems described herein may be implemented in a number of ways. Example implementations are provided below with reference to the following figures.

FIG. 1 illustrates a side cross-section view of an object of interest, which is depicted throughout this disclosure as a shoe 102, having a portion of a robotic CMM 104 extending into an inner region of the shoe 102. Although the shoe 102 may be an exemplary object of interest which is thoroughly discussed herein, the systems, devices, and methods of the present disclosure are not to be construed as limited to use with shoes. In various embodiments, the shoe 102 may rest upon or be coupled to a fixture 106 that is placed on a base 108 which supports a robot arm 110 of the robotic CMM 104 via a support arm 112. For example, a top surface of the fixture 106 may have an adhesive layer disposed thereon such that the shoe 102 may be pressed onto the fixture to create a permanent or temporary bond between the shoe 102 and the fixture 106. Furthermore, the fixture 106 may be held in place with respect to the base 108 by, e.g. pegs or clamps. In some embodiments, the fixture 106 may be held in place by an electromagnet. For example, the base 108 may include an electromagnet system which may be energized to initiate magnetic forces. The fixture 106 may be made of a ferrous material that becomes strongly attracted to the electromagnet system once it is energized. Accordingly, an operator may easily position the fixture 106 with respect to the base 108 and, therefore, the robotic CMM 104 while the electromagnet is not energized. Once the fixture is properly aligned, the electromagnet may be energized to hold the fixture 106 in position. The robot arm 110 may have a plurality of links 114 that are coupled together at motorized joints 116, each joint having a corresponding position encoder, to form a mechanical linkage 118 that is controllable adaptable to an object. For example, as illustrated a shape of the mechanical linkage 118 has been adapted to an interior of the shoe 102 to insert a CDS probe 120 into a toe box 122 of the shoe 102 without any portion of the robot arm 110, e.g. the mechanical linkage 118, coming into inadvertent contact with the shoe 102. The CDS probe 120 may be configured to detect or calculate points of contact between the CDS probe 120 and surfaces to determine dimension data for the surfaces. Accordingly, the robot arm 110 may move the CDS probe 120 across surfaces of an object of interest without bumping into the object of interest.

In some embodiments, the robotic CMM 104 may include a linear actuation component 124 configured move the robot arm 110 with respect to the shoe 102 (or any other object of interest for that matter). An exemplary linear actuation component 124 may include one or more guide rods 126(1)-126(2) that each slide through a corresponding linear guide bearing. In some embodiments, a motor 128 may be configured to rotate a lead screw 130 in order to drive the robot arm 110 toward or away from the shoe 102. Thus, in the illustrated embodiment, as the robot arm 110 conforms to and is inserted into the shoe 102, the linear actuation component 124 may be driven to toward the shoe 102 so that successive ones of the links 114 may be inserted into the shoe 102.

In some embodiments, individual ones of the links 114 are configured to change length. For example, with particular reference to link 114(2), a first portion 132 of the link 114(2) may be configured to move linearly with respect to a second portion 134 of the link 114(2) to controllably alter a distance between joints 116(1) and 116(2). For example, the second portion 134 may be configured to telescopically slide into and out of the first portion 132.

In some embodiments, the robotic CMM 104 may include a computer vision unit 136 to record footage of the shoe 102 to identify various features thereof. For example, the computer vision unit 136 may enable the robotic CMM 104 to identify surfaces of interest of the shoe 102 to assist with performing a dimensioning protocol. For example, in the illustrated embodiment, the computer vision unit 136 may enable the robotic CMM 104 to identify and locate an insole 138 of the shoe 102 so that the robot arm 110 may bring the CDS probe 120 into contact with and begin dimensioning the insole 138. In particular, in the illustrated example implementation, computer vision may be used to identify an opening into an interior region of the shoe 102 and to enable the robot arm 110 to navigate the CDS probe 120 through the opening into the interior region. Exemplary computer vision technologies for use with the techniques described herein include, but are not limited to, stereo vision, LIDAR, RIDAR, Time-of-Flight for Light, and any other computer vision technologies whether now existing or subsequently developed.

In some embodiments, the robotic CMM 104 may be configured to perform laser guidance techniques to identify a point for initial contact with the object of interest. For example, the computer vision unit 136 may be configured to identify a point at which the object of interest is being "painted" with a laser beam, i.e. a point at which a laser is striking the object of interest. Once this point is identified, the robotic CCM 104 may cause the robot arm 110 to bring the probe 120 into initial contact with the object of interest at the identified point. An exemplary implementation of such techniques is to have a manual operator paint an interior surface of a shoe with a laser to enable the robotic CMM 104 to navigate through the shoe opening.

Figure 2:
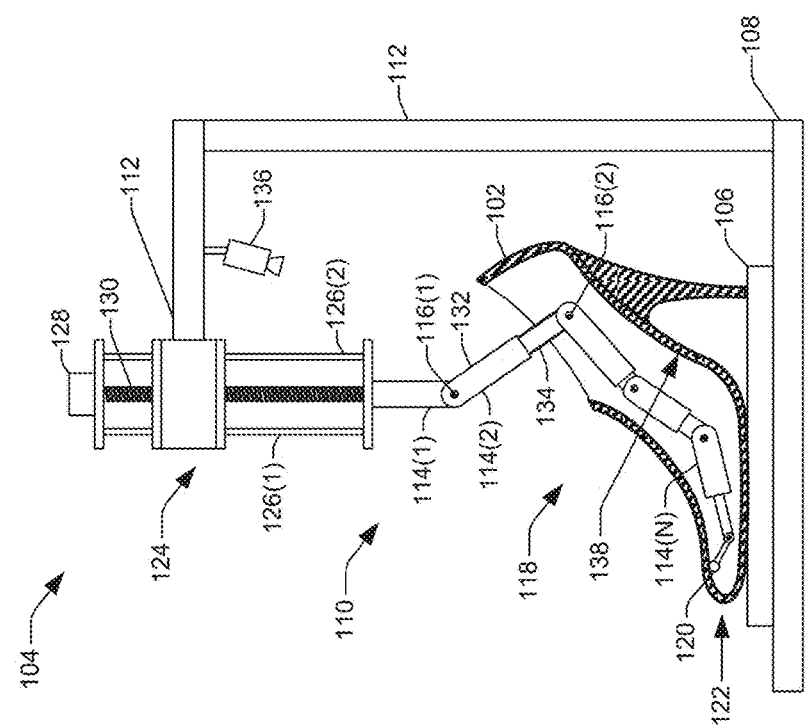
FIG. 2 illustrates a top cross-section view of a shoe with a contact direction sensitive (CDS) probe traversing across an insole of the shoe to collect insole dimension data.

FIG. 2 illustrates a top cross-section view of the shoe 102 with the CDS probe 120 traversing across an insole surface 138 of the shoe 102 to collect insole dimension data. In particular, the robot arm 110 may slide the CDS probe 120 across the insole surface 138 on a first path 202(1) toward an inner side surface 204 of the shoe 102, e.g. toward point 206(1). While the CDS probe 120 is moving along the first path 202(1) a reaction force may be monitored between a portion of the CDS probe 120 (i.e. the bottom of the probe as illustrated). In some implementations, the path of the CDS probe 120 may be dynamically adjusted based on the reaction force in order to maintain an optimal amount of pressure between the CDS probe 120 and the particular surface(s) being dimensioned. For example, the robot arm 110 may maintain just enough pressure for the contact to be detected but not so much pressure that the insole is deformed or the shoe 102 inadvertently moved on the fixture 106. As the CDS probe 120 comes into contact with the inner side surface 204 at the first point 206(1), contact with the inner side surface 204 may be detected based on a change to the reaction force. For example, just prior to contacting the inner side surface 204 at the first point 206(1), the totality of the reaction force against the probe 120 is resulting from pressure exerted by the insole surface 138 against the CDS probe 120. Once the CDS probe 120 contacts the inner side surface 204 at point 206(1) the reaction force may then consist of multiple component forces. For example, the first component force that is exerted by the insole surface 138 remains while another component force resulting from the inner side surface 204 is initiated upon contact. Thus, at point 206(1) the reaction force is the sum of two component forces.

In some implementations, upon contacting the inner side surface 204 the robotic CMM 104 may change the path 202 from the first path 202(1) to a second path 202(2) along which the CDS probe 120 slides across the insole surface 138 until a second inner side surface 210 opposite the first inner side surface 204 is contacted at point 206(2). In some implementations, the CDS probe 120 may be caused to slidably traverse back and forth along one surface (e.g. 138) between two other surfaces (e.g. 204 and 210) in order to collect quickly and efficiently collect dimension data associated with a particular surface. For example, the CDS probe 120 may be traversed back and forth across the insole surface 138 to collect a sufficient data prior to dimensioning one or more other surfaces of interest.

In some implementations, upon contacting the inner side surface 204 at point 206(1), the path 202(1) may be changed to cause the CDS probe 120 to track against the inner side surface 204 away from the insole surface 138. For example, robot arm 110 may raise the CDS probe 120 away from the insole surface 138 along the outer side surface to collect dimension data associated with the inner side surface 204.

In some embodiments, the CDS probe 120 may be coupled to a distal end of the robot arm 110 by one or more actuators 208. For example, a first actuator 208(1) may be configured to rotate an arm 210 with respect to a distal link 114(N) and a second actuator 208(2) may be configured to rotate a probe rod 212 with respect to the arm 210. Accordingly, the actuators 208 may be deployed to move a probe tip 214 independently with respect to the distal link 114(N), i.e. the probe tip 114 may be moved across a surface even when the distal link 114(N) remains static. In some implementations, the actuators 208 may be deployed to perform fine movements of the CDS probe 120 while other portions of the robot arm 110, e.g. the mechanical linkage 118, may be used to perform course movements. In various embodiments, the actuator 208(1) may also be configured to linearly actuate the arm 210 with respect to the distal link 114(N). For example, referring back to FIG. 1, the arm 210 is depicted as linearly extended from the distal link 114(N) into the toe box 122 of the shoe 102 and also rotated by the actuator 208(1) such that actuator 208(2) may be deployed to bring the probe tip 214 into contact with an upper portion of the toe box 122.

Figure 3A:
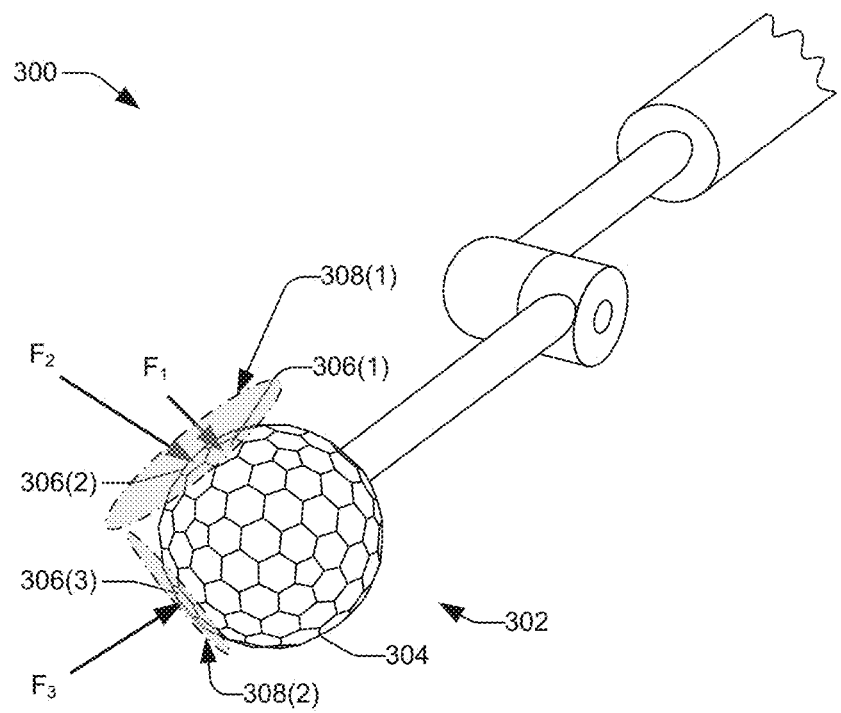
FIG. 3A illustrates a first embodiment of a CDS probe that includes a rounded probe tip having a touch sensitive outer surface to directly detect points of contact with surfaces of an object.

FIG. 3A illustrates a first embodiment of a CDS probe 300 that includes a rounded probe tip 302 having a touch sensitive outer surface 304 to detect points of contact with surfaces of an object that is being dimensioned. In some embodiments, the touch sensitive outer surface 304 may include a plurality of sensors 306 to detect discrete points of contact between the outer surface 304 and objects of interest. For example, as illustrated, sensors 306(1) and 306(2) are each in contact with a first surface 308(1) which results in reaction forces $F_1$ and $F_2$. In some embodiments, directions corresponding to the forces may be determined based on which sensors are being contacted at any given point in time. For example, directions from which each of reaction forces $F_1$ and $F_2$ originate on the outer surface with respect to a datum of the rounded probe tip 302 may be determined based on which sensors are experiencing reaction forces. As illustrated, the rounded probe tip 302 is also in contact with the surface 308(2) at sensor 306(3). Thus, based on the reaction forces $F_1$, $F_2$, and $F_3$ being exerted on sensors 306(1), 306(2), and 306(3) respectively, internal dimension data for each of surfaces 308(1) and 308(2) may be determined. More specifically, because each degree of freedom between various components of the robotic CMM 104 may be precisely measured with high precision encoders and because the precise geometry of each component is known, an exact location of the rounded tip datum can be calculated. Furthermore, based on known geometrical dimensions of the rounded probe tip's outer surface 304, the exact location of the various points of contact can be calculated and stored as or used to generate dimension data for the object of interest. For example, one or more of the points of contact which are sensed while the rounded probe tip is slid across surfaces of the object may be stored as point cloud data and/or used to generate a computerized model of the object of interest.

Figure 3B:
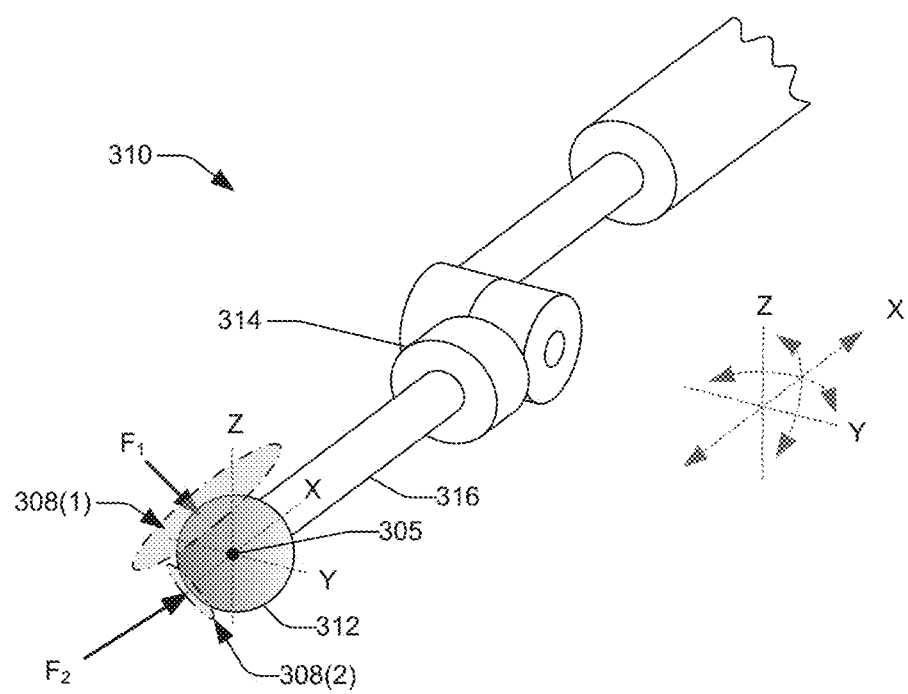
FIG. 3B illustrates a second embodiment of a CDS probe that includes a rounded probe tip and a load cell for determining reaction forces against the rounded probe tip.

FIG. 3B illustrates a second embodiment of a CDS probe 310 that includes a rounded probe tip 312 and a load cell 314 for determining reaction forces exerted against the rounded probe tip 312 by surfaces that it contacts. The rounded probe tip 312 may be coupled to a distal end of a rod 316 (i.e. an end of the rod that is located away from the robot arm) such that forces exerted on the rounded probe tip 312 may be detected by the load cell 314 as moments and/or axial forces. For example, with respect to the coordinate system depicted, the load cell 314 may detect moments about the Z-axis and Y-axis and axial forces along the X-axis. Prior to the rounded probe tip 314 contacting surface 308(2), a first point of contact between the probe tip and the surface 308(1) may be determined based on a corresponding direction of $F_1$. For example, if the rounded probe tip 314 is being moved along the X-axis with no detected axial load and moments detected about each of the Y-axis and Z-axis, the point of contact with the probe tip may be calculated based on the assumption that the direction corresponding to $F_1$ is perpendicular to surface 308(1) and/or the point on the rounded probe tip 314 being contacted. Continuing with this example, if a reference datum for the rounded probe tip 314 is located at is centroid, then based on the load sensor 314 experiencing 0.0000 lbs. of axial load along the X-axis and 0.0050 ft-lbs. about each of the Y-axis and the Z-axis, a direction of the force $F_1$, and therefore, its point of origin (assuming it is acting perpendicularly to the surface causing it) may be calculated at coming from 45 degrees up from the z-plane, 45 degrees left of the y-plane, and on the x-plane.

Upon the rounded probe tip 314 coming into contact with the surface 308(2) which results in the reaction force $F_2$ being exerted against the probe tip 314, the change in the total reaction force may be used to calculate a direction of origin the reaction force $F_2$ with respect to the probe tip's datum 305. For example, if the change in the total reaction force is simply the addition of an axial component along the X-axis with no change to the moments about each of the Y-axis and the Z-axis, then it can be determined that the point of contact between the probe tip and the surface 308(2) is the outermost point of the rounded probe surface. Of course, if the change in the total reaction force includes a change to the moments about one or both of the Y-axis and the Z-axis, then the components of $F_2$ may be determined and used to calculate the point of contact of surface 308(2) and the probe tip. Once again based on known geometrical dimensions of the rounded probe tip's 312 outer surface, the exact location of the various points of contact can be calculated and stored as or used to generate dimension data for the object of interest.

In some embodiments, the weight of the probe tip 312 and/or rod 316 may be calibrated out of each of the component forces and/or moments detected by the load cell 314. Calibrating out the component forces may account for the orientation of the CDS probe 312 with respect to the gravitational pull. For example, if the rod 316 is horizontal with respect to the gravitational pull, then a moment corresponding to the weight of the rod 316 and tip 314 about the Y-axis may be calibrated out of the load cell's 314 measurements.

Figure 4A:
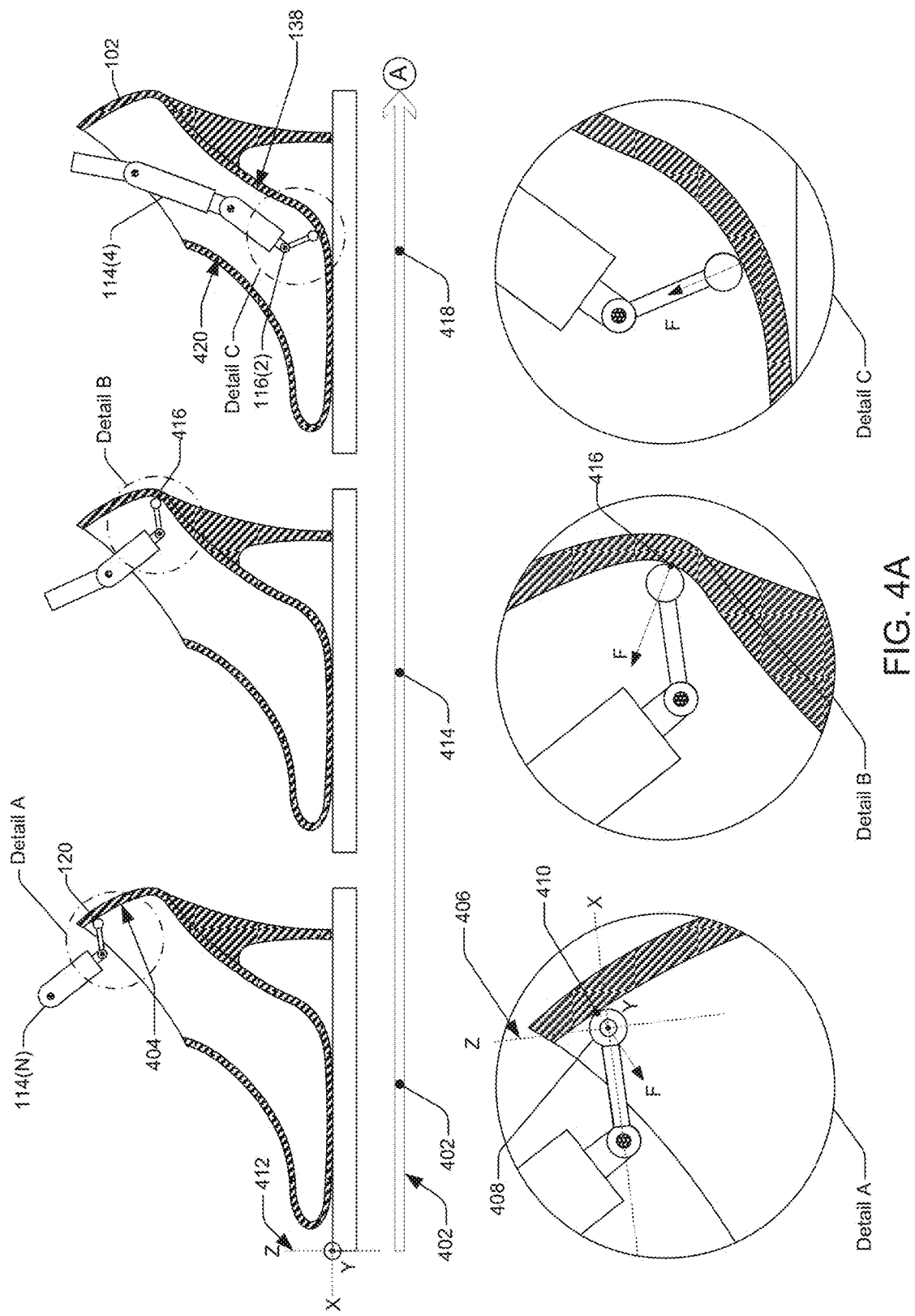
FIGS. 4A-4B illustrate an exemplary implementation of detecting dimension data for internal surfaces of the shoe in which a CDS probe is traversed through various positions against the internal surfaces over time. In particular.
Figure 4B:
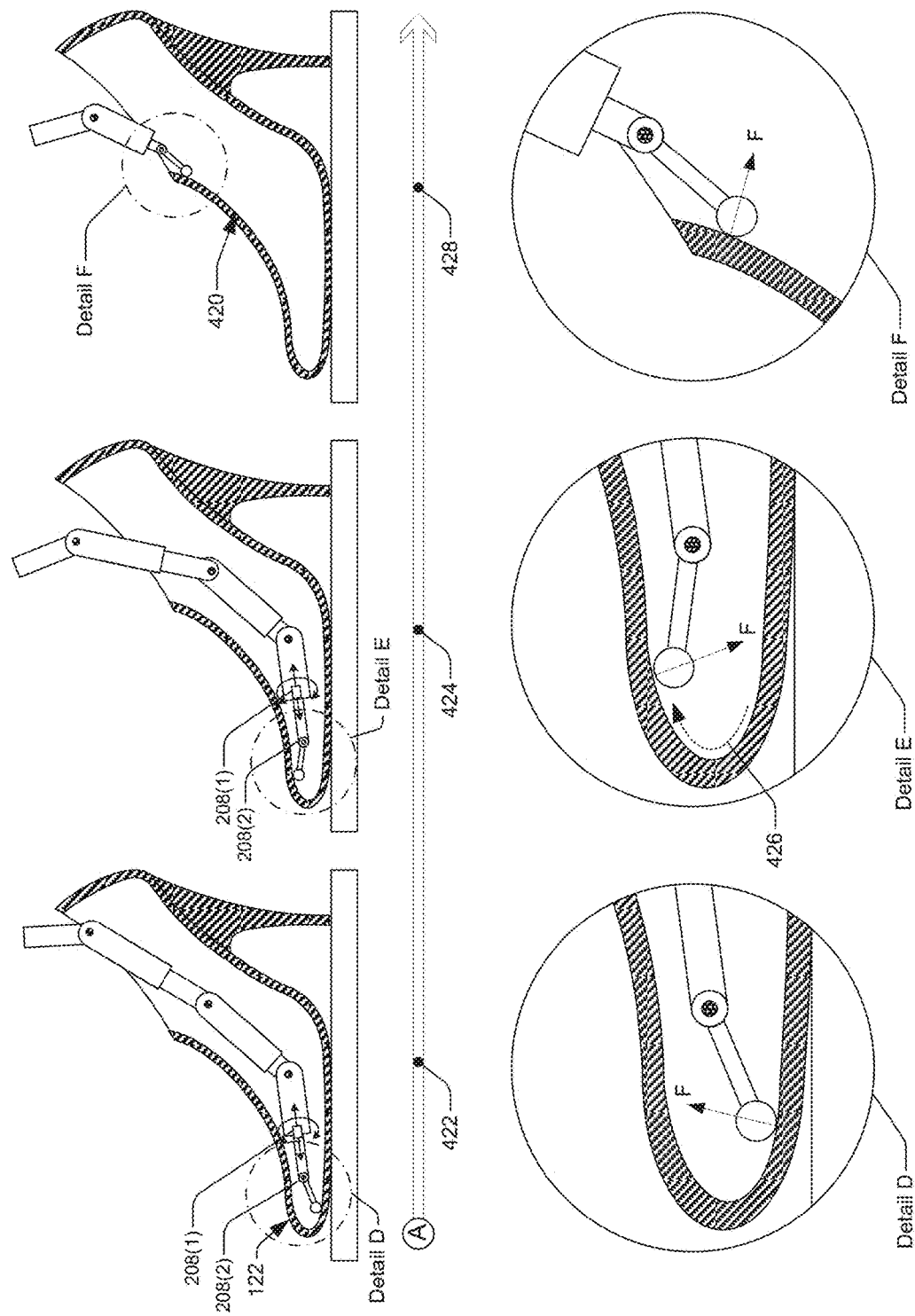

FIGS. 4A-4B illustrate an exemplary implementation of detecting dimension data for internal surfaces of the shoe 102 in which a CDS 120 probe is traversed through various positions against the internal surfaces over time. In particular, FIGS. 4A-4B depict the CDS probe 120 in different positions within the shoe 102 with reference to a timeline 402. In the timeline 202 time passes from the left to right and from FIG. 4A to 4B. Detail views of the CDS probe 120 at the various positions are shown below the timeline 402.

At time 402, the CDS probe 120 is shown slightly after having been brought into contact with an interior surface 404 of the shoe 102. As illustrated in detail A, the contact between the CDS probe 120 and the interior surface 404 results in a reaction force F. A direction of the reaction force with respect to a datum reference system 406 of the rounded probe tip 408 may be determined. As illustrated, the datum reference system 406 includes a Z-axis and X-axis which are parallel to the page and a Y-axis which is perpendicular to the page. Also as illustrated, the datum reference system 406 is centered on a centroid of the rounded probe tip 408 which is illustrated as a spherical tip. With respect to the datum reference system 406, the precise point of contact 410 between the spherical tip and the interior surface 404 may be determined based on the assumption that the force F is perpendicular to the interior surface 404 and, therefore, passes through the center of the datum reference system 406. Furthermore, because the orientation and center-point location of the datum reference system 406 can be determined with respect to a master datum reference system 412 which remains static with respect to the robotic CMM 104, the point of contact 410 can also be determined within the master reference system 412. Although not depicted in each detail view of FIGS. 4A-4B, it will be appreciated that the datum reference system 406 remains static with respect to the CDS probe 120 and dynamic with respect to the master reference system 412.

Between times 402 and 414, the robot arm 110 (including the actuators 208) may be deployed to slide the probe tip across the surface 404 to point 416. While the probe tip is slide across the surface, the magnitude and/or direction of the reaction force may be monitored in order to follow contours associated with the surface 404. For example, between points 410 and 416, the contours of the surface 404 have resulted in the direction of the reaction force changing from left-down with respect to the master reference system 412 at point 410 to left-up at point 416.

Between times 414 and 418, the robotic arm 110 may begin to conform to an interior region of the shoe 102 to enable an additional length of the robotic arm 110 to be inserted into the shoe 102 without inadvertently contacting the shoe 102. For example, without contacting the shoe 102 with anything other than the CDS probe 120. As illustrated, between times 414 and 418 joint 116(N) has enabled link 114(N) to rotate with respect to its neighboring link 114(4) so that it can be further inserted into the shoe 102 to track the insole 138 without inadvertently contacting the upper 420. Furthermore, between times 414 and 418, the robotic CMM 104 may continually monitor changes to the direction of the reaction force and dynamically modify a course of the CDS probe 120 to track the contours of the insole 138.

Between times 418 and 422, the CDS probe tracks along a generally flat plantar region of the insole 138 and into the toe box 122. Then, between times 422 and 424 as the CDS probe 120 tracks the inner surface of the toe box 122 along the curved path 426, the direction of origin of the force (e.g. with respect to the reference systems 406 and 412) begins to change at a significant rate. In some implementations, a speed at which the CDS probe 120 moves along a surface may be at least partially dependent on a rate of change in the direction and/or magnitude of the reaction force. For example, as the rate of change increases the robotic CMM 104 may reduce a speed of the CDS probe 120.

In some implementations, an amount of dimensional data being collected with respect to a particular region of the shoe 102 (or any object of interest for that matter) may be based on changes to the direction of the force within the particular region. For example, as compared to the plantar region traversed between times 418 and 422, the direction of the reaction force changes quite rapidly along the course 426. Accordingly, increased dimensional data (e.g. an increased density of points within a point cloud corresponding to the shoe dimensions) may be desirable within the toe box 122 region as compared to the plantar region.

In some embodiments, one or more actuators 208 may be deployed in the event that movement of other portions of the robotic arm 110 such as the mechanical linkage 118 becomes impracticable for various reasons. For example, it may be impracticable to insert the distal link 114(N) any further into the toe box 122 due to the size of the distal link 14(N) with respect to the toe box 122 and so the actuators 208 may be deployed to extend and/or rotate the arm 210 and rod 212 with respect to the distal link 114(N). Accordingly, as shown in FIG. 4B, the distal link 114(N) may remain static between times 418 and 422 as the actuators 208 are deployed to cause the CDS probe 120 to traverse along the path 426.

Between times 424 and 428, the robotic CMM 104 may traverse the CDS probe 120 along an inner surface of the shoe's 102 upper 420 and ultimately may withdraw the CDS probe 120 from the shoe 102 altogether as the dimensioning is completed.

Figures 5A, 5B:
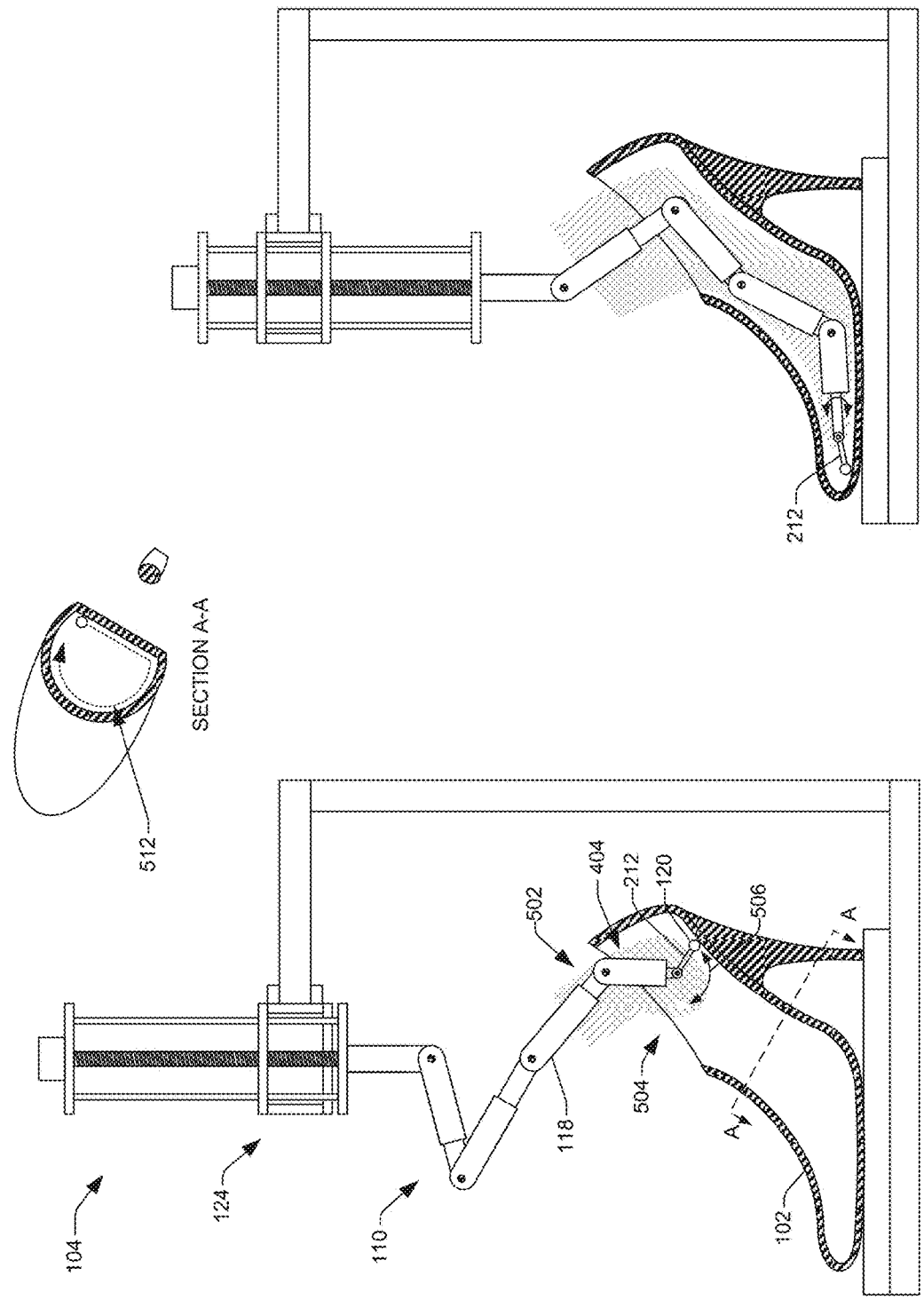
FIGS. 5A and 5B illustrate an implementation of developing a clearance zone 502 within which portions of the robotic arm 110 may be maneuvered without inadvertently contacting the shoe 102 or other object of interest.

FIGS. 5A and 5B illustrate an implementation of developing a clearance zone 502 within which portions of the robotic arm 110 may be maneuvered without inadvertently contacting the shoe 102 or other object of interest.

With reference to FIG. 5A, the robotic arm 110 may begin to be inserted into an opening 504 of the shoe 102. For example, the mechanical linkage 118 may be lowered toward the shoe 102 by the linear actuation component 124. As the robotic arm 110 is inserted into the shoe 102, the CDS probe 120 may be traced along the interior surface 404 of the shoe 102. Dimension data corresponding to the interior surface 404 may be used to determine the clearance zone 502. For example, as the robotic CMM 104 gathers additional dimension information corresponding to the interior surface 404 it may use this information to ensure that movements of the robot arm 110 do not attempt to occupy the same space as the shoe 102. Accordingly, the robotic CMM 104 may be configured not only to precisely control the location of the CDS probe 120 with respect to surfaces of the shoe 102 which are to be dimensioned but also to simultaneously adapt the shape of other components of the robotic arm 110 such as, for example, the mechanical linkage 118 to avoid contact with the shoe 102.

In some embodiments, the CDS probe 120 may be successively moved around in order to identify volumes of space which may be occupied without contacting the shoe 102. For example, as shown in FIG. 5A the CDS probe tip may be toggled away from and then back toward the surface 404 along path 506. As illustrated, along a majority of the path 506, the CDS probe 120 is not contacting surfaces of the shoe 102 and, therefore, may be unable to further collect dimension data corresponding to the shoe 102 along much of the path 506. However, volumes of space which the CDS probe 120 successfully occupies while returning a null value in terms of reaction force may be used to define the clearance zone 502.

In some embodiments, boundaries of the clearance zone 502 may fall directly on the surfaces as detected by the CDS probe 120. For example, staying within the clearance zone 502 may simply require that no components other than the CDS probe 120 can contact the shoe 102. In some embodiments, such as illustrated in FIGS. 5A and 5B, the clearance zone 502 may be offset from the interior surfaces of the shoe 102. For example, as shown in FIG. 5A the clearance zone is depicted by cross-hashing which does extend all the way to the interior surfaces of the shoe 102. Offsetting the clearance zone 502 from the interior surfaces of the shoe 102 may provide a safety margin with respect to inadvertent movements of the robot arm 110 and/or imperfect correlations between the dimension data generated to define the surfaces of interest and the actual location of these surfaces.

In some embodiments, one or more components other than the CDS probe 120 may be permitted to operate outside of the clearance zone 502. For example, as shown in each of FIGS. 5A and 5B, the rod 212 is shown extending beyond the clearance zone 502 while other components such as, for example, the mechanical linkage 118 are confined to operate within the clearance zone 502.

As the robot arm 110 is moved from the position shown in FIG. 5A to that shown in FIG. 5B, the CDS probe 120 may be continually moved around within the interior region of the shoe 102 to identify additional void space to add to the clearance zone. For example, in some implementations, the CDS probe 120 may be periodically moved out of contact with the interior surfaces to identify volumes of space to add to the clearance zone 502. In some embodiments, predetermined characteristics associated with an object of interest may be used to identify void space without ever physically occupying that void space with the CDS probe 120. For example, in the illustrated implementation wherein the object of interest is a shoe 102, tracing the CDS probe 120 along a closed path on a single plane, e.g. plane 510, may safely define a perimeter of a void space. In particular, with reference to Section A-A taken on FIG. 5A, it should be appreciated that traversing the probe 120 around the perimeter 512 with the knowledge that the object of interest is a shoe may enable a safe assumption that the traced perimeter bounds a void volume intended for a foot to occupy while the shoe is being worn such that the robotic arm 110 may also occupy that space while maintaining clearance from the surfaces of the shoe.

In some embodiments, the clearance zone 502 may be determined tracing successive perimeters of the shoe 102 such as the perimeter 512 with each successive perimeter being deeper into the interior region of the shoe 102 than the previous perimeters. Accordingly, in some embodiments, the clearance zone 502 may be defined by tracing such successive perimeters without causing the CDS probe 120 to explore void space within the shoe, e.g. move around in shoe to locations where it is not contacting the interior surfaces and therefore is unable to collect additional dimension data.

Figure 6:
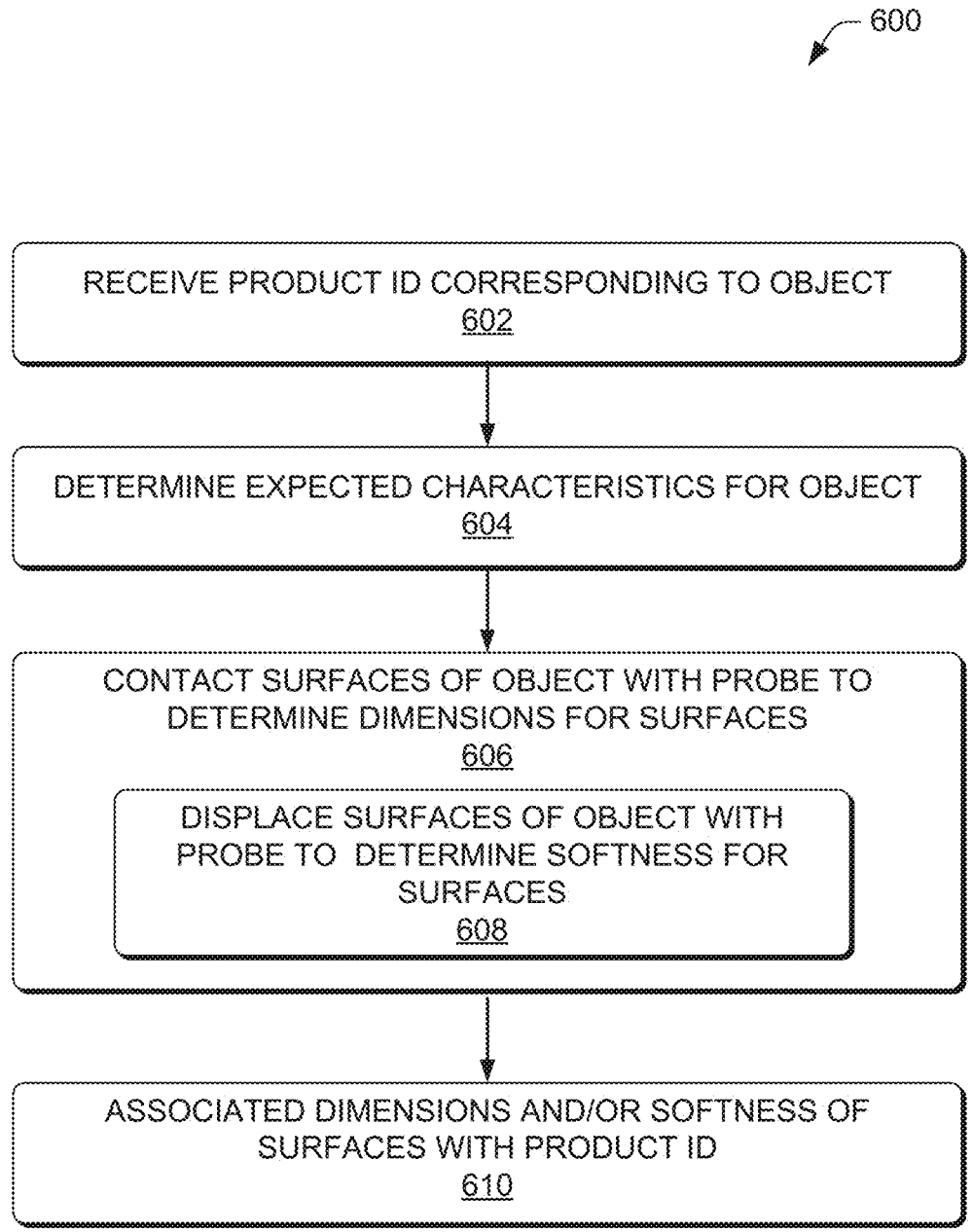
FIG. 6 is a flow diagram of an illustrative process to determine dimensions and softness data for a plurality of surfaces of an object based on expected characteristics of the object

FIG. 6 is a flow diagram of an illustrative process 600 to determine dimensions and softness data for a plurality of surfaces of an object based on expected characteristics of the object. The process 600 is described with reference to FIGS. 1-5 may be performed by the CDS probe control system 700 of FIG. 7.

At block 602, the system 700 may receive a product identifier corresponding to object of interest that is ready to be examined. The product identifier may uniquely identify the object of interest. In some embodiments, the product identifier may be associated with a type indication which indicates the type of product that object is. For example, the product identifier be associated an indication that object of interest is a women's high heel shoe.

At block 604, the system may determine expected characteristics for the object. In some embodiments, the expected characteristics may be based on the product identifier and/or the type indication. For example, based on the product identifier the system may determine that the object is a closed toe high heel shoe and is therefore expected to include a downward sloping insole with an outer side surface and an inner side surface as well as a closed toe box. In some embodiments, the system 700 may search for expected surfaces to dimension based on the product identifier received at block 602.

At block 606, the system 700 may cause a robot arm to contact one or more surfaces such as, for example, the expected surfaces to determine dimensions for the one or more surfaces. For example, determining the dimensions may be achieved by contacting the surfaces with the CDS probe at a plurality of different points such as by sliding or otherwise moving the CDS probe along the surfaces and determining a plurality points at which the CDS probe contacted the surfaces while being moved along the surfaces. In some implementations, points may be uniformly or substantially uniformly spaced along a particular path of contact. For example, the CDS probe may be slide across a surface and dimension data may include a data point indicating a point of contact every 3 or every 5 millimeters. In some embodiments, contacting the one or more surfaces at block 606 includes displacing the one or more surfaces to determine softness data for the surfaces at block 608. For example, at a plurality of points along the surfaces, the system 700 may press the CDS probe into the surface correlate an amount of force with an amount of deployment. These correlations may be used to determine softness data for the surfaces based on a uniform scale to enable meaningful cross-product comparisons. For example, the operation of block 608 may enable softness data associated with an insole of product A offered from manufacturer A to be compared to softness data associated with an insole of product B from manufacturer B. As used herein, softness data includes any information indicating characteristics of a physical displacement of a surface in response to touch such as, for example, a force applied by a human foot or the CDS probe. For example, softness data for a particular surface may include a profile of an applied force versus a displaced distance of the surface.

At block 610, the system 700 may associate the dimensions and/or softness data determined at blocks 606 and/or 608 with the product identifier. Associating dimension and softness data with the product identifiers enables accurate cross product comparisons which may be used by a remote merchant to make product recommendations to consumers based on past products. For example, based on a consumer having indicated a first product which had been discontinued, a remote merchant may identify a second product for recommendation based on the dimension and/or softness data being comparable to the first product.

Figure 7:
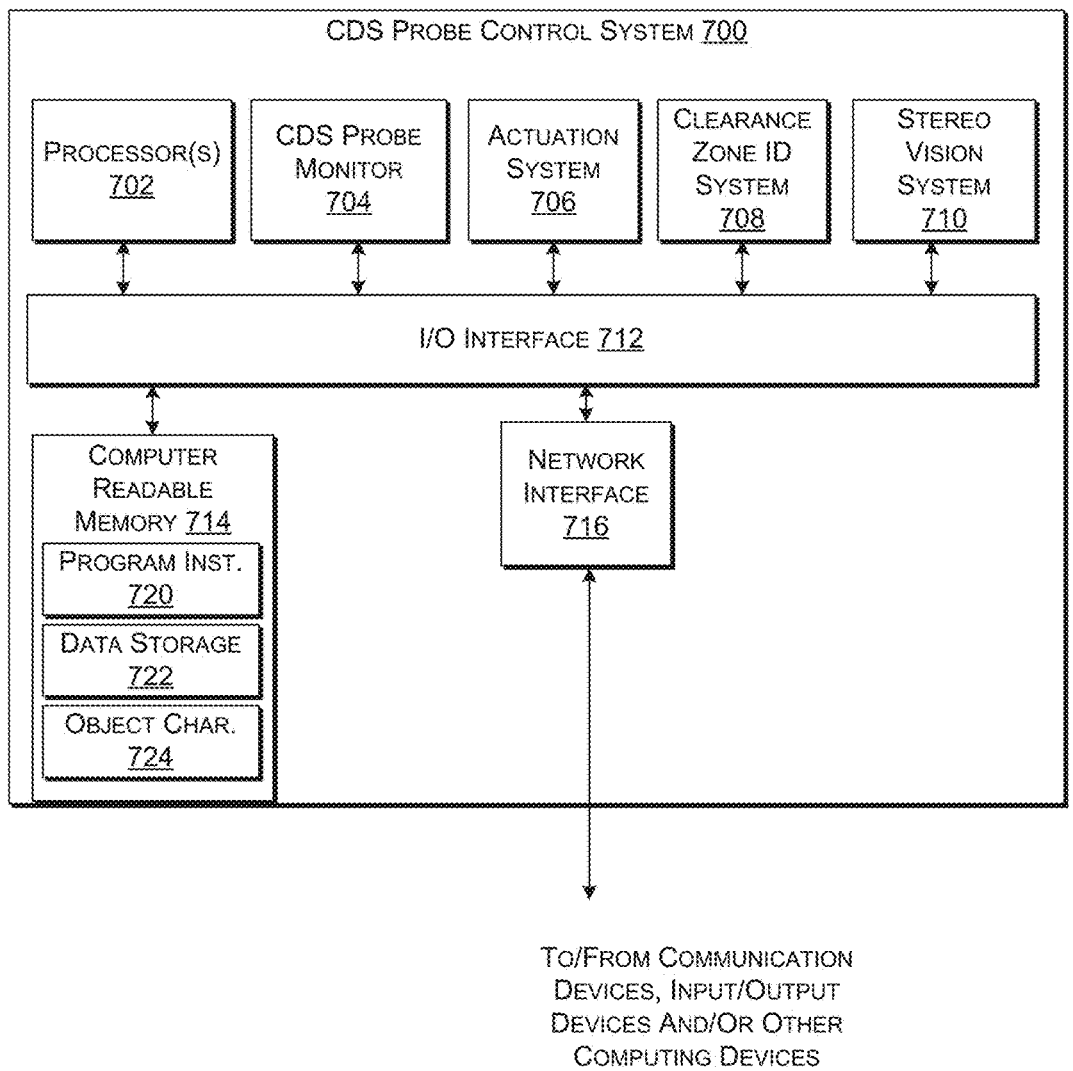
FIG. 7 is a block diagram of an illustrative CDS probe control system in accordance with the present disclosure.

FIG. 7 is a block diagram of an illustrative CDS probe control system 700 in accordance with the present disclosure. In various examples, the block diagram may be illustrative of one or more aspects of the CDS probe control system 700 that may be used to implement the various systems, devices, and techniques discussed herein. In the illustrated implementation, the CDS probe control system 700 includes one or more processors 702, coupled to a non-transitory computer readable storage medium 714 via an input/output (I/O) interface 712. The CDS probe control system 700 may also include a CDS probe monitor 704, actuation system 706, a clearance zone identification system 708, and/or a stereo vision system 710. The CDS probe control system 700 may further include a network interface 716.

In various implementations, the CDS probe control system 700 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 714 may be configured to store executable instructions, object characteristics, and/or data items accessible by the processor(s) 702. In various implementations, the non-transitory computer readable storage medium 714 may be implemented using any suitable memory technology, such as static random access memory (SRAM), synchronous dynamic RAM (SDRAM), nonvolatile/Flash-type memory, or any other type of memory. In the illustrated implementation, program instructions and data usable to implement desired functions, such as those described above, are shown stored within the non-transitory computer readable storage medium 714 as program instructions 720, data storage 722, and object characteristic data 724, respectively. In some implementations, program instructions, data and/or object characteristic data may be received, sent or stored upon different types of computer-accessible media, such as non-transitory media, or on similar media separate from the non-transitory computer readable storage medium 714 or the control system 700. Generally speaking, a non-transitory, computer readable storage medium may include storage media or memory media such as flash memory (e.g., solid state memory), magnetic or optical media (e.g., disk) coupled to the control system 700 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 716. In some embodiments, the I/O interface 712 may be configured to coordinate I/O traffic between the processor(s) 702, the non-transitory computer readable storage medium 714, and any peripheral devices, the network interface or other peripheral interfaces, such as input/output devices 718.

The CDS probe monitor 704 may communicate with a CDS probe such as by receiving a real time data feed corresponding to the reaction force(s) being exerted on the CDS probe. In some embodiments, the CDS probe monitor 704 receive data from a touch sensitive outer surface of the CDS probe or tip thereof in order to determine precise points of contact between the CDS probe and one or more surfaces of an object of interest. In some embodiments, the CDS probe monitor 704 may receive data from a load cell and use the same to calculate a direction of origin of a reaction force. For example, in an embodiment in which the CDS probe includes a spherical probe tip, an assumption that reaction forces will act perpendicularly to their surface of origin at their point of origin may lead to an assumption that the corresponding force vector passes through the centroid of the probe tip. Thus, the precise point of origin of the reaction force may be calculated by the CDS probe monitor 704. Data points identified by the CDS probe monitor 704 may be used to generate dimension data associated with the object of interest. For example, the data points may be compiled to generate a point cloud representation of the object of interest. In some embodiments, the data points may be used to generate a 3-D model of the object of interest.

The actuation system 706 may control movements of the CDS probe by deploying one or more motors and/or actuators. For example, each one of a plurality of movable joints may include a motor and a position encoder and the actuation system may monitor data feeds from the encoders and send instructions to the motors to precisely traverse the CDS probe across surfaces of the object of interest. The clearance zone identification system 708 may operate to perform one or more operations discussed herein with relation to sensing and avoiding surfaces of the object of interest while the actuation system 706 is inserting the CDS probe deep into an interior cavity of the object of interest. The clearance zone identification system 708 may also operate to monitor (e.g. listen to) instructions sent from the actuation system 706 to perform clearance checks with respect to where the instructions will cause components of the robot arm to occupy with respect to the defined clearance zone and/or object surfaces. The stereo vision system 710 may be deployed to visually examine the object of inters to identify characteristics thereof which may be useful in performing techniques described herein. For example, the stereo vision system 710 may identify an opening into an interior region of the object and/or an orientation of the object, e.g. a direction the toe is pointing, to assist the actuation system 706 in calculating appropriate actuation commands.

In particular, actuation system 706, clearance zone identification system 708, and/or the stereo vision system 710 may perform any operations and/or move any componentry discussed in relation to FIGS. 1-6.

The network interface 716 may be configured to allow data to be exchanged between the CDS probe control system 700, other devices attached to a network, such as other computer systems. For example, the network interface 716 may enable wireless communication between the CDS probe 120 and the CDS probe monitor 704. In various implementations, the network interface 716 may support communication via wireless general data networks, such as a Wi-Fi network. For example, the network interface 716 may support communication via telecommunications networks such as cellular communication networks, satellite networks, and the like.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system for determining internal dimensions of a shoe, the system comprising:
   a fixture to support the shoe;
   a robot arm to traverse a contact direction sensitive (CDS) probe along one or more interior surfaces of the shoe to generate a reaction force against the CDS probe, the CDS probe configured to detect at least a magnitude of the reaction force and a direction of the reaction force, the robot arm including a plurality of links that are pivotably connected at motorized joints to form a mechanical linkage;
   one or more processors; and
   one or more computer readable storage media storing instructions that are executable by the one or more processors to:
      cause the robot arm to move the CDS probe into contact with a first interior surface of the shoe to initiate the reaction force;
      cause the robot arm to slide the CDS probe in a first direction along the first interior surface to determine first internal dimension data corresponding to the first interior surface;
      identify, based on a first change in the direction of the reaction force, contact between the CDS probe and a second interior surface of the shoe to determine second internal dimension data corresponding to the second interior surface;
      in response to the contact between the CDS probe and the second interior surface, cause the robot arm to move the CDS probe in a second direction toward a third interior surface of the shoe to determine an additional amount of the first internal dimension data or the second internal dimension data; and
      identify, based on a second change in the direction of the reaction force, contact between the CDS probe and the third interior surface to determine third internal dimension data corresponding to the third interior surface.

2. The system of claim 1, wherein the CDS probe is coupled to a distal link of the plurality of links via at least one actuator configured to move a rounded tip of the CDS probe within at least two degrees of freedom with respect to the distal link.

3. The system of claim 1, wherein the instructions are further executable by the one or more processors to:
   determine an internal cavity profile based at least in part on the first internal dimension data and the second dimensional data; and
   cause a shape of the mechanical linkage to adapt to the internal cavity profile to insert the CDS probe at least partially into a toe box of the shoe without contacting the one or more interior surfaces of the shoe.

4. The system of claim 3, wherein the CDS probe is coupled to the mechanical linkage via at least one actuator coupled to a distal link of the plurality of links, and wherein the instructions are further executable by the one or more processors to cause the at least one actuator to move the CDS probe along the one or more interior surfaces while the mechanical linkage remains within a clearance zone.

5. The system of claim 1, wherein the CDS probe is configured to detect components of the reaction force including at least a first component along a first axis, a second component along a second axis, and a third component along a third axis, and wherein the instructions are further executable to determine the magnitude and the direction of the reaction force based on the components.

6. The system of claim 1, wherein the CDS probe includes a rounded probe tip coupled to a first end of a rod and a load cell coupled to a second end of the rod, the load cell to detect at least a force along a first axis and one or more moments about at least one of a second axis or a third axis, and wherein the instructions are further executable by the one or more processors to determine a point of contact between the rounded probe tip and the one or more interior surfaces based on the force and the one or more moments.

7. The system of claim 1, wherein the CDS probe includes a rounded probe tip having a touch sensitive outer surface to detect one or more points of contact between the touch sensitive outer surface and the one or more interior surfaces of the shoe.

8. A computer-implemented method to determine internal dimensions of an object of interest, the method comprising:
   causing a robot arm to move a contact direction sensitive (CDS) probe into contact with a first interior surface of the object of interest to generate at least one reaction force, the at least one reaction force having a magnitude and a direction;
   identifying, based on a first component of the at least one reaction force, a first point of contact between a rounded outer surface of the CDS probe and the first interior surface;
   causing the robot arm to move the CDS probe along the first interior surface on a first path to determine internal dimension data corresponding to the first interior surface;
   monitoring the at least one reaction force while the CDS probe is moving along the first interior surface;
   determining, based on a change to the direction of the at least one reaction force, that the CDS probe has moved into contact with a second interior surface of the object of interest;
   identifying, based on a second component of the at least one reaction force, a second point of contact between the rounded outer surface and the second interior surface, wherein the change to the direction of the at least one reaction force is caused by the second component; and
   in response to the contact with the second interior surface, causing the robot arm to move the CDS probe on a second path along the first interior surface or the second interior surface.

9. The computer-implemented method of claim 8, further comprising:
   monitoring the at least one reaction force while the CDS probe is sliding along the first interior surface on the second path;
   determining, based on a second change to the direction of the at least one reaction force, that the CDS probe has moved into contact with a third interior surface of the object of interest; and
   in response to the contact with the third interior surface, causing the robot arm to move the CDS probe on a third path along the first interior surface, the third path leading the CDS probe into contact with the second interior surface.

10. The computer-implemented method of claim 8, further comprising:
monitoring at least one of the direction or the magnitude of the reaction force to determine a contour of the first surface; and
dynamically adjusting the first path to cause the CDS probe to follow the contour of the first surface.

11. The computer-implemented method of claim 10, further comprising:
determining, based at least in part on the contour of the first surface, a clearance zone corresponding to an interior volume of the object of interest; and
causing a shape of the robot arm to adapt to the clearance zone to insert the robot arm into the interior volume without contacting interior surfaces of the object of interest, the interior surfaces including at least the first interior surface and the second interior surface.

12. The computer-implemented method of claim 8, further comprising:
receiving a product identifier that corresponds to the object of interest, wherein the product identifier is associated with at least a type indication of the object of interest; and
determining, based on the type indication, expected characteristics of at least the first interior surface and the second interior surface.

13. The computer-implemented method of claim 8, further comprising accessing computer vision imagery of the object of interest to identify an opening into an interior region of the object of interest, wherein the causing the robot arm to move the CDS probe into contact with the first interior surface includes causing the robot arm to move the CDS probe through the opening into the interior region.

14. The computer-implemented method of claim 8, further comprising:
causing the CDS probe to displace at least one of the first interior surface or the second interior surface to determine correlations between amounts of force and amounts of displacement; and
determining, based on the correlations, softness data associated with at least one of the first interior surface or the second interior surface.

15. The computer-implemented method of claim 8, further comprising generating at least one of a point cloud or a three-dimensional model of the first interior surface and the second interior surface based at least in part on the internal dimension data.

16. A system comprising:
a contact direction sensitive (CDS) probe coupled to a distal end of a robot arm, the CDS probe to configured to detect a magnitude and a direction of a reaction force exerted against the CDS probe, the robot arm including a plurality of links that are pivotably connected at motorized joints to form a mechanical linkage;
one or more processors; and
one or more computer readable storage media storing instructions that are executable by the one or more processors to:
cause the robot arm to move the CDS probe into contact with an interior surface of an object to initiate the reaction force;
cause the robot arm to move the CDS probe in a first direction along the interior surface to determine internal dimension data corresponding to the interior surface;
monitoring at least changes to the direction of the reaction force to identify a contour of the interior surface; and
in response to identifying the contour, cause the robot arm to dynamically modify the first direction to determine additional internal dimension data by tracking the interior surface with the CDS probe.

17. The system of claim 16, wherein tracking the interior surface includes deploying one or more actuators to move the CDS probe independently with respect to a distal link of the robot arm.

18. The system of claim 16, wherein at least one of the plurality of links is configured to dynamically modify a length between a pair of corresponding joints.

19. The system of claim 16, further comprising a linear actuation component configured to traverse the robot arm toward and away from the object of interest to enable insertion of the robot arm into the object of interest successive removal of the robot arm from the object of interest.

20. The computer-implemented method of claim 8, wherein the rounded outer surface of the CDS probe includes a rounded probe tip having a touch sensitive outer surface to detect one or more points of contact between the touch sensitive outer surface and the one or more interior surfaces of the object of interest.

* * * * *